United States Patent [19]
Lorenz et al.

[11] Patent Number: 6,149,747
[45] Date of Patent: Nov. 21, 2000

[54] CERAMIC MARKING SYSTEM WITH DECALS AND THERMAL TRANSFER RIBBON

[75] Inventors: Michael A. Lorenz, Miamisburg; Joseph D. Roth, Springboro, both of Ohio

[73] Assignee: NEC Corporation

[21] Appl. No.: 09/038,250

[22] Filed: Dec. 4, 1997

Related U.S. Application Data

[63] Continuation of application No. 08/681,542, Jul. 23, 1996, abandoned.

[51] Int. Cl.⁷ .................................................. C03B 29/00
[52] U.S. Cl. ........................ 156/89.11; 156/234; 156/240; 428/195
[58] Field of Search .................... 428/195; 156/89.23, 156/234, 240, 89.11; 430/200

[56] References Cited

U.S. PATENT DOCUMENTS

| | | | |
|---|---|---|---|
| 3,589,925 | 6/1971 | Bell et al. | 106/299 |
| 3,894,167 | 7/1975 | Kluge et al. | 428/40 |
| 5,209,796 | 5/1993 | Sakuramoto et al. | 156/89 |

*Primary Examiner*—William Krynski
*Assistant Examiner*—Hong Xu
*Attorney, Agent, or Firm*—Millen White Zelano & Branigan PC

[57] ABSTRACT

There is provided by the present invention a coating formulation and thermal transfer ribbon and printer which provide printed images that will permanently mark ceramic material when the printed image is applied to the surface of a ceramic article and fired. These formulations and ribbons contain ceramic pigments that will fuse to the surface of a ceramic material when fired. The printed images can be applied to ceramic materials using the decals of this invention which comprise a printed image on a sacrificial receiving substrate that vaporizes or decomposes when fired. Methods for permanently marking ceramic articles are also provided as are permanently marked ceramic articles.

16 Claims, 3 Drawing Sheets

CERAMIC MARKING SYSTEM WITH DECALS AND THERMAL TRANSFER RIBBON

This is a continuation of application Ser. No. 08/681,542 filed on Jul. 23, 1996, now abandoned.

FIELD OF THE INVENTION

The present invention relates to thermal transfer printing and ceramic marking. More particularly, the present invention relates to the use of printed decals and thermal transfer media to permanently mark ceramic articles with pigments, wherein the image printed on the decal is prepared by thermal transfer printing.

BACKGROUND OF THE INVENTION

The most common form of marking or coloring ceramic materials involves coating the surface of a ceramic article, fired or unfired (green), with a dispersion of ceramic pigments and firing the coated article to obtain permanent coloration. The ceramic material, ceramic pigments, dispersion additives and firing conditions can vary widely. For example, the ceramic materials can include clay-based ceramics, glass ceramics and refractory glassware; the ceramic pigments can include a vast array of alkali metal oxides, transition metal oxides and mixtures thereof and the dispersion additives can include glazing materials and fluxes to form a vitrifiable mixture or additives such that the pigment dispersion is non-vitrifiable (stain).

The most common method for applying the ceramic pigment is dipping, spraying or painting the ceramic article with a dispersion of the pigment within a volatile liquid carrier and evaporating the liquid carrier. These techniques do not allow for fine patterning due to limited control over the coating step and in some cases due to running of the pigment dispersion during firing.

Decals have been used to decorate ceramics with fine patterns. As disclosed by Kluge et al. in U.S. Pat. No. 3,894,167, to prepare these decals, an image or marking is printed on a substrate, such as paper, wherein the printed image contains a ceramic pigment. This printed image is then transferred to a ceramic article and fired. Kluge et al. disclose that the print is preferably overcoated with a lacquer to provide adhesion to the ceramic. To release the printed image from the paper substrate to the ceramic article, the paper is typically wet or a wax is added to the paper. The unremoved substrate and any organic components are burned away when fired. Kluge et al. describe decals wherein a wax is incorporated in the print itself to aid separation from the substrate. Unlike thermal transfer printing, the entire wax layer is transferred to the receiving substrate without differentiation and without heating.

Kluge indicates that the printed patterns can be obtained using liquid inks in lithography, off-set printing and screen-printing. Hayakawa et al. (U.S. Pat. No. 5,421,877) disclose a ceramic color composition applied to glass surfaces by screen printing. These printing methods require significant preparation and effort to perform.

In screen printing, a stencil representing the non-printing areas is prepared and applied to a silk or nylon fine-mesh screen. Ink is applied to the patterned screen by scrapping with a rubber squeegee and the ink is then transferred to a receiving substrate. In lithographic printing a pattern is formed on an ink carrier. Liquid ink is distributed to water receptive areas of the carrier such as a drum carrier to the exclusion of water repellent areas (grease receptive). The patterned ink on the carrier is then transferred to a receiving substrate. Off-set printing works on the same principle as lithographic printing requiring the preparation of a pattern on an ink carrier. However, the ink is transferred to an intermediate carrier before being transferred to the desired substrate. These printing methods require significant preparation prior to printing in that a patterned screen or ink carrier must be prepared. In contrast, thermal transfer printing can be characterized as an "on demand" printing method in that it requires little preparation for a new image.

In thermal transfer printing, images are formed on a receiving substrate by heating extremely precise areas of a print ribbon with thin film resistors. This heating of the localized area causes transfer of pigment from the ribbon to the receiving substrate. Thermal transfer printing has displaced many forms of printing such as lithography due to its speed and flexibility in providing printed images on demand. Thermal transfer printing has also displaced impact printing in many applications due to advances such as the relatively low noise levels which are attained during the printing operation.

The thermal transfer process provides great flexibility in generating images and allows for broad variations in style, size and color of the printed image. Representative documentation in the area of thermal printing includes the following patents:

U.S. Pat. No. 3,663,278, issued to J. H. Blose et al. on May 16, 1972, discloses a thermal transfer medium comprising a base with a coating comprising of cellulosic polymer, thermoplastic aminotriazine-sulfonamide-aldehyde resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,687,701, issued to K. Knirsch et al. on Aug. 18, 1987, discloses a heat sensitive inked element using a blend of thermoplastic resins and waxes.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. Nos. 5,128,308 and 5,248,652, issued to Talvalkar, each disclose a thermal transfer ribbon having a reactive dye which generates color when exposed to heat from a thermal transfer printer.

U.S. Pat. No. 5,240,781, issued to Obatta et al., discloses an ink ribbon for thermal transfer printers having a thermal transfer layer comprising a wax-like substance as a main component and a thermoplastic adhesive layer having a film forming property.

It is desirable to take advantage of the quality, versatility and economy of thermal transfer printing in permanently marking ceramic articles.

SUMMARY OF THE INVENTION

It is an object of the present invention to provide permanent images on ceramic articles wherein the images are derived from a thermal transfer printing process.

It is another object of the present invention to provide coating formulations and thermal transfer media obtained therefrom which will provide permanent images on ceramic articles once applied thereto and fired.

It is another object of the present invention to provide coating formulations and thermal transfer media obtained therefrom which contain ceramic pigments in an amount sufficient to form permanent images on ceramic articles once applied thereto and fired.

It is another object of the present invention to provide a decal which can be applied to ceramic articles and fired to permanently mark said ceramic article, wherein said decal has a printed image from thermal transfer printing which contains ceramic pigments in an amount sufficient to permanently mark a ceramic article when applied thereto and fired.

It is another object of the present invention to provide a ceramic marking method for permanently marking ceramic articles using a decal with a printed image from thermal transfer printing which contains ceramic pigments in an amount sufficient to permanently mark a ceramic article when applied thereto and fired.

It is another object of the present invention to provide a thermal printer used in combination with a thermal transfer ribbon which contains ceramic pigments in an amount sufficient to permanently mark a ceramic article when applied thereto and fired.

These and other objects and advantages of the present invention will become apparent and further understood from the detailed description and claims which follow, together with the annexed drawings.

The above objects are achieved through the use of a coating formulation, thermal transfer medium, decal, permanently imaged ceramic article, ceramic marking method and/or thermal printer provided by the present invention.

There is provided by this invention a coating formulation which forms thermal transfer layers for thermal transfer media which transfer images to a receiving substrate upon exposure to the print head of a thermal printer, wherein said images contain sensible materials that will permanently mark a ceramic material when applied to the surface of the ceramic material and fired, said formulation comprising wax, binder resin, optionally solvent and a sensible material comprising ceramic pigment in an amount sufficient to form thermal transfer layers that will provide printed images which can permanently mark a ceramic material when said printed image is applied to the surface of said ceramic material and fired.

In another aspect of the present invention, there is provided a thermal transfer medium which transfers images to a receiving substrate when exposed to the print head of a thermal printer, said thermal transfer medium comprising a flexible substrate with a thermal transfer layer positioned thereon, said thermal transfer layer comprising wax, binder resin, sometimes residual solvent, and a sensible material comprising a ceramic pigment in an amount sufficient to provide images that can permanently mark ceramic materials when applied to the surface of a ceramic material and fired.

An additional aspect of this invention is a decal which will permanently mark a ceramic material when applied to the surface of a ceramic material and fired, said decal comprising a printed image layer positioned on a sacrificial receiving substrate obtained from thermal transfer printing, said printed image layer comprising wax, binder resin and a sensible material which comprises a ceramic pigment in an amount sufficient to permanently mark a ceramic material when said printed image is applied to the surface of said ceramic material and fired on the surface of said ceramic material.

An additional aspect of this invention is a method for permanently marking ceramic articles which comprises depositing an image layer which contains ceramic pigments on a sacrificial receiving substrate by thermal transfer printing to form a decal, applying the decal to the surface of a ceramic article and firing the article to decompose the sacrificial receiving substrate and organic components of the image layer and deposit the ceramic pigments on the surface of said ceramic article, said printed image layer comprising an amount of ceramic pigment sufficient to permanently mark a ceramic material when applied thereto and fired on the surface of said ceramic material.

Another aspect of this invention is a ceramic article with a permanent image defined by thermal transfer printing.

A further aspect of the present invention is a thermal printer used in combination with a thermal transfer ribbon which will transfer images from a thermal transfer layer to a receiving substrate. The ribbon contains a thermal transfer layer with a ceramic pigment in an amount sufficient to form printed images that permanently mark ceramic materials when said printed images are applied to the surface of a ceramic material and fired on the surface of said ceramic material.

DETAILED DESCRIPTION OF THE PREFERRED EMBODIMENTS

The coating formulation of this invention comprises the components of conventional coating formulations such as one or more waxes, binder resins and solvents. However, the sensible material (pigment or dye) employed comprises a ceramic pigment including mixtures of ceramic pigments.

Ceramic pigments suitable for this invention include vitrifiable pigments and non-vitrifiable pigments (stains). The vitrifiable pigments are typically used with flux or other glass forming compound.

The ceramic pigments can be classified generally as transition metal oxides and alkali metal oxides. The most common are characterized as the Spinelle type and the zircon-silicate type pigments. These transition metal oxides and alkali metal oxides must often be used in mixtures with other elements to generate color and vary the color. These are referred to as spectral elements in U.S. Pat. No. 5,340,387 and chromophores in U.S. Pat. No. 3,589,925. The ceramic pigments are used in mixtures to obtain variations in color. Fluxes can also alter color. The number and identity of ceramic pigments varies widely as shown by Smith in U.S. Pat. No. 5,340,387, wherein specific commercial pigments are identified at column 4, lines 15 to 63, and claim 1 therein ranging from phthalocyanine blue to chromophthal scarlet R. Others are identified in *Ullman's Encyclopedia of Technical Chemistry* 1972, col. 14, page 1 and U.S. Pat. No. 4,927,671 issued to Nawothing.

Other specific examples of ceramic pigments include: the spinelle pigments based on zinc-chromite disclosed in U.S. Pat. No. 5,254,162 issued to Speer et al., the cadmium red-based decorating enamels disclosed in U.S. Pat. No. 4,264,679 issued to Panzarino, the iron-containing zircon-based pigments disclosed in U.S. Pat. No. 3,166,430, issued to Seabright, the zircon pigments disclosed in 3,528,835 issued to Gascon, the vanadium-zirconium based pigments with indium or yttrium oxide disclosed in U.S. Pat. No. 2,875,086, issued to Weyl, the zirconium based stains disclosed in U.S. Pat. No. 4,047,970, issued to Morriss et al., the black cobalt-based pigments disclosed in U.S. Pat. No. 4,205,996, issued to Eppler, the cobalt and aluminum-based pigments disclosed in U.S. Pat. No. 2,644,767, issued to Duncan, the glass stable zirconium-based ceramic pigments disclosed in U.S. Pat. No. 3,847,639, issued to Broll et al., the zirconium-based ceramic pigments disclosed in U.S. Pat. No. 3,589,925 and U.S. Pat. No. 3,573,080 issued to Bell, the grey ceramic pigments based on zircon and disclosed in U.S. Pat. No. 4,486,236 issued to Olby, the spinelles disclosed by Speer et al. in U.S. Pat. No. 5,194,089 at column 2, and the yellow zirconium/praseodymium based pigment disclosed by Seabright.

The ceramic pigments are preferably added to the formulation in manner consistent with conventional methods for introducing conventional pigments. However, alternative (non-conventional) methods for preparing the coating formulations of this invention may also suitable. The ceramic pigment is preferably employed in an amount sufficient to permanently color a ceramic material when applied thereto and fired. The ceramic pigment is typically employed in an amount in the range of about 5 to 80 wt. %, preferably 20–60 wt. %, based on the dry components.

The coating formulations of this invention contain wax as a main dry component. Suitable waxes provide temperature sensitivity and flexibility. Such waxes can be natural waxes such as carnauba wax, candelilla wax, rice bran wax, bees wax, lanolin, motan wax and ceresine wax; petroleum waxes such as paraffin wax and microcrystalline waxes; synthetic hydrocarbon waxes such as low molecular weight polyethylene and Fisher-Tropsch wax; higher fatty acids such as lauric acid, myristic acid, palmitic acid, stearic acid and behenic acid; higher aliphatic alcohols such as stearyl alcohol and esters such as sucrose fatty acid esters, sorbitane fatty acid esters and amides. Mixtures of waxes can also be used. Particular examples of suitable waxes are carnauba wax under the Slip-Ayd series of surface conditioners by Daniel Products Co. and low molecular weight polyethylene.

The melting point of the wax is less than 250° C. and typically falls within the range of from 40° C. to 250° C., preferably from 60° C. to 150° C. Waxes with melting points at the high end are advantageous in that they aid in the integrity of the printed image.

The amount of wax used in the coating formulations of present invention is above 5 wt. % based on the dry ingredients, preferably 25 to 85 wt. % based on the dry ingredients. To aid in processing, rheology and compatibility with binder resin, micronized grades of wax are preferred.

The coating formulation of this invention also comprises a binder resin. Suitable binder resins are those conventionally used in coating formulations for thermal transfer ribbons. These include thermoplastic resins and reactive resins such as epoxy resins.

Examples of suitable thermoplastic binder resins include those used in conventional coating formulations such as those described in U.S. Pat. Nos. 5,240,781 and 5,348,348.

Particular examples of suitable thermoplastic resins include the following: polyvinylchloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, polyketone resin, terpene resin, petroleum resin, polyurethane resin, polyvinyl butyryl, styrene-butadiene rubber, nitrile rubber, acrylic rubber, ethylene-propylene rubber, ethylene alkyl (meth)acrylate copolymer, styrene-alkyl (meth) acrylate copolymer, acrylic acid-ethylene-vinyl acetate terpolymer, saturated polyesters and sucrose benzoate. Suitable saturated polyesters are further described in U.S. Pat. No. 4,983,446. Preferred thermoplastic binder resins include sucrose benzoate, polyethylene, polyketone resins and styrene copolymers. To obtain emulsions of binder resins which are insoluble or poorly soluble in water, the binder resin is typically ground to submicron size.

Suitable reactive binder components include epoxy resins and a polymerization initiator (crosslinker). Suitable epoxy resins include those that have at least two oxirane groups such as epoxy novolak resins obtained by reacting epichlorohydrin with phenol/formaldehyde condensates or cresol/formaldehyde condensates. Another preferred epoxy resin is polyglycidyl ether polymers obtained by reaction of epichlorohydrin with a polyhydroxy monomer such as 1,4 butanediol. A specific example of suitable epoxy novolak resin is Epon 164 available from Shell Chemical Company. A specific example of the polyglycidyl ether is available from Ciba-Geigy Corporation under the trade name Araldite® GT 7013. The epoxy resins are preferably employed with a crosslinker which activates upon exposure to the heat from a thermal print head. Preferred crosslinkers include polyamines with at least two primary or secondary amine groups. Examples being Epi-cure P101 and Ancamine 2014FG available from Shell Chemical Company and Air Products, respectively. Accelerators such as triglycidylisocyanurate can be used with the crosslinker to accelerate the reaction. When used, the epoxy resins typically comprise more than 25 wt. % of the coating formulation based on dry components in view of their low viscosity. Waxes are typically not necessary when reactive epoxy resins form the binder.

Preferred coating formulations may contain two or more resins to provide specific property profiles. For example, Piccotex resins by Hercules are hydrocarbon resins (vinyl toluene-alpha methyl styrene copolymers) that provide high hot tack properties which aid adhesion of the coating to the synthetic resin receiving substrate upon transfer. Polyethylene SL 300, a polyethylene resin emulsion of a small (submicron) particle size is a surface conditioner within the Slip-Ayd series by Daniel Products which provides slip or wax-like properties for transfer. These binder resins can be used together or with other resins to provide a specific property profile.

The binder resin has a melting/softening point of less than 300° C. and preferably in the range of 40° C. to 250° C. To provide high scratch and smear resistant images on synthetic resin substrates, the binder resin may comprise at least 25 wt. %, based on total dry ingredients, of the coating formulation. In preferred embodiments, the binder resin comprises 2 wt. % to 75 wt. % of the total dry ingredients.

The binder resin is preferably compatible with the wax such that it does not separate out in aqueous dispersions or emulsions which contain 2 to 25 wt % wax, based on the total weight of said dispersion or emulsion. Such compatibility ensures a high loading of binder resin for producing images with high scratch and smear resistance. To enhance compatibility, i.e., minimize separation, it is preferable for the binder resin and wax particles to be submicron size particles.

The coating formulation of the present invention may contain other solids such as another sensible material (pigment or magnetic particles) in addition to the ceramic pigments. Other solids are preferably colorless inorganic pigments used as filler or glazing materials that do not to interfere with the color of the ceramic pigments. Sensible materials other than inorganic pigments and the ceramic pigments may be included where they serve a purpose prior to firing since most will degrade thereafter. Any coloring agent used in conventional ink ribbons is suitable for use prior to firing, including carbon black and a variety of organic and inorganic coloring pigments and dyes. Use of magnetic pigment particles is expected conflict with the objects of the present invention in most cases, but the use of such particles is not excluded from this invention.

The other solids or additional sensible materials are typically used in an amount of from 0 to 40 wt. % based on the total dry ingredients of the coating formulation. The total amount of sensible material, including the ceramic pigment is typically from about 5 to 90 wt. % of the total dry ingredients for the coating formulation. The additional pigment can form 1 to 20%, preferably 5 to 15% of the total dry ingredients.

The coating formulation may contain plasticizers, such as those described in U.S. Pat. No. 3,663,278, to aid in processing of the thermal transfer layer. Suitable plasticizers are adipic acid esters, phthalic acid esters, ricinoleic acid esters, sebasic acid esters, succinic acid esters, chlorinated diphenyls, citrates, epoxides, glycerols, glycols, hydrocarbons, chlorinated hydrocarbons, phosphates, and the like. The plasticizer provides low temperature sensitivity and flexibility to the thermal transfer layer so as not to flake off the substrate that supports the thermal transfer layer.

The coating formulation may contain other conventional additives for thermal transfer media including flexibilizers such as oil, weatherability improvers such a UV light absorbers, and fillers. The coating formulation may further contain surfactants and dispersants which aid dispersion of the ceramic pigments.

The coating formulations of this invention can contain the above identified solids in an aqueous or organic solution, dispersion or emulsion or be free of solvent (hot melt) The coating formulation is preferably water-based or water-rich. However, the solvents can vary widely and included in this invention are coating formulations wherein water is a minor portion of the total solvent or completely absent. The organic solvents used with water include alcohols such as propanol. While it is desirable to eliminate all organic solvent from the formulation, small amounts of organic solvent significantly enhance the stability and dispersion of solids in the formulation. Mineral spirits is a preferred organic solvent. Other suitable solvents include selected esters, ketones, alcohols, aliphatics, aromatics and ethers.

The solids content of the coating formulation is typically within the range of 15 to 80 wt. % and more typically within the range of 20–55 wt. %. The solids content can be higher (up to 100%), depending on the viscosity of the dry components therein, where a hot melt formulation is desired.

Preferred coating formulations comprise 10 to 85 wt. % wax, 40 to 75 wt. % binder resin and 20 to 60 wt. % ceramic pigment based on the total weight of dry ingredients. A preferred formulation is that containing a mixture of wax, an ethyl vinyl acetate copolymer binder resin and a zircon based ceramic pigment.

The coating formulation of the present invention can be prepared in conventional equipment, such as an attritor, ball mill, or simple vessel with an impeller, by combining the ingredients as dispersions to this equipment and agitating the same. The solids are typically added as dispersions at about 30 wt. % solids. The wax is typically added first and the remaining components are added with minor heating. The preferred method is to mix the solvent, wax components and binder resin at an elevated temperature, preferably about 65° C., for about 15 minutes, after which the ceramic pigment is added and the resulting mixture is ground in an attritor at an elevated temperature, preferably from about 60° C. to 65° C., for about two hours.

The thermal transfer medium of the present invention comprises a substrate, preferably a thin smooth paper or plastic-like material and a thermal transfer layer comprised of wax, binder resin, sometimes residual solvent and a ceramic pigment. Suitable waxes, binder resins and ceramic pigments are as described above. Suitable substrate materials include tissue type paper materials such as 30–40 gauge capacitor tissue, manufactured by Glatz and polyester-type plastic materials such as 14–35 gauge polyester film manufactured by Dupont under the trademark Mylar®. Polyethylene naphthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness to prolong the life of heating elements within thermal print heads. The thickness is preferably 3 to 10 microns. If desired, the substrate or base film may be provided with a backcoating on the surface opposite the thermal transfer layer.

The thermal transfer layer is typically obtained from the coating formulation of the present invention in the form of either a solution, dispersion or emulsion or as a hot melt (no solvent). The thermal transfer layer may contain all the additives and components suitable for the coating formulations described above. The presence of residual solvent is dependent on the effectiveness of drying step in forming the thermal transfer layer. Once applied to the substrate, a portion of the solvent can remain in the coating. The residual solvent is typically undesirable but it may aid in transferring the image.

The thermal transfer layer (functional layer) preferably has a softening point within the range of about 50° C. to 250° C. which enables transfer at normal print head energies which range from about 100° C. to 250° C. and more typically from about 100° C. to 150° C.

The thermal transfer layers can be prepared by conventional techniques and equipment such as a Meyer Rod or like wire round doctor bar set up on a conventional coating machine to provide the coating weights described below. The coating weight of the thermal transfer layer typically ranges from 1.9 to 8.0 g/m². A temperature of about 65° C. is maintained during the entire coating process. After the coating formulation is applied, it is optionally passed through a dryer at an elevated temperature to ensure drying and adherence of the functional layer to the substrate. The thermal transfer layer can be fully transferred onto a receiving substrate such as paper or synthetic resin at a temperature in the range of 75° C. to 200° C.

The thermal transfer media of the present invention provides the advantages of thermal printing while providing printed images which can be transferred to ceramic articles. When the thermal transfer media (ribbon) is exposed to the heating elements of the thermal print head, the thermal transfer layer softens and transfers from the medium (ribbon) to the receiving substrate with the ceramic pigments therein.

Figure 1:
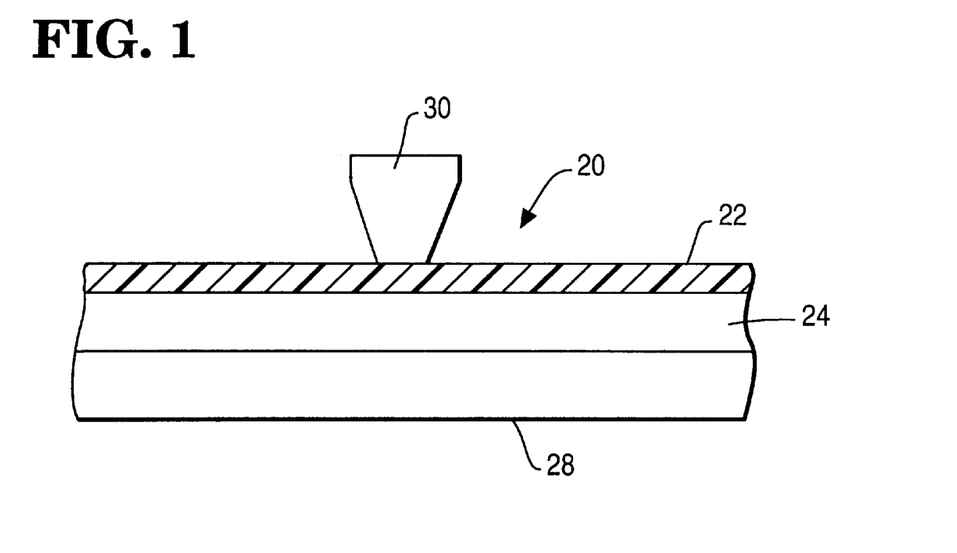
FIG. 1 illustrates a thermal transfer medium of the present invention in a printing operation prior to thermal transfer.
Figure 2:
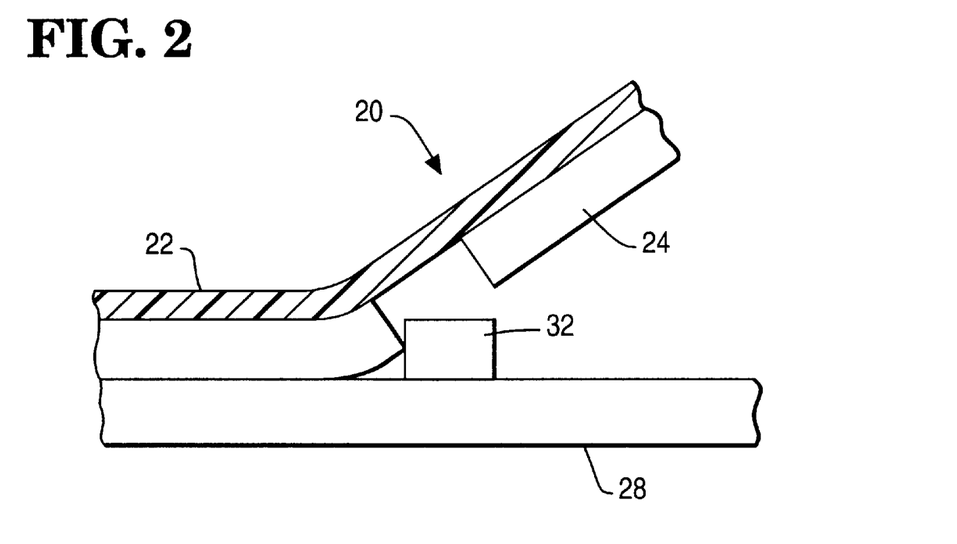
FIG. 2 illustrates a thermal transfer medium of the present invention in a printing operation after thermal transfer.

Thermal transfer ribbon 20, as illustrated in FIGS. 1–2, is a preferred embodiment of this invention and comprises substrate 22 of a flexible material which is preferably a thin smooth paper or plastic-like material. Positioned on substrate 22 is thermal transfer layer 24, also referred to as a functional layer. The thermal sensitivity of thermal transfer layer 24 is determined by the softening point of the wax and binder resin therein. The thermal transfer layer 24 contains a wax and binder resin which are preferably compatible so that exposure to heat from print head 30 uniformly transfers thermal transfer layer 24 from substrate 22 to synthetic resin receiving substrate 28 and forms image 32.

Preferred thermal transfer media contain thermal transfer layers which comprise 10 to 80 wt. % wax, 40 to 75 wt. % binder resin and 20 to 60 wt. %, based on the total weight of dry ingredients.

There is provided by this invention thermal transfer printers used in combination with a thermal transfer ribbon of this invention. All printer hardware and software for the equipment is conventional except for the thermal transfer ribbon media of this invention which contains a thermal transfer layer within ceramic pigment in an amount sufficient to form printed images that permanently mark ceramic materials when applied thereto and fired.

Figure 3:
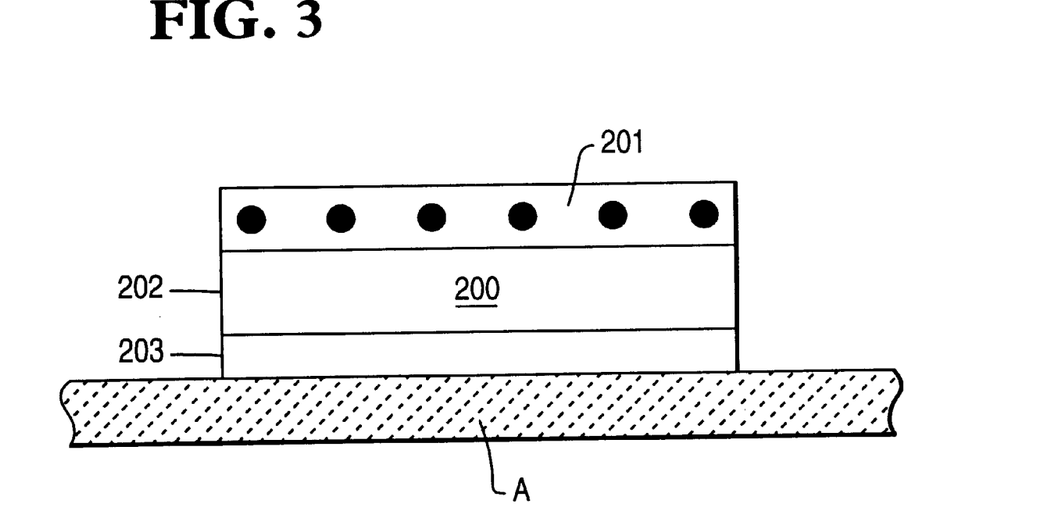
FIG. 3 illustrates a decal of the present invention positioned on a ceramic article.

The decals of this invention are derived from thermal transfer media of this invention following transfer by a thermal transfer printer. These decals comprise an image layer positioned on a substrate, preferably a sacrificial substrate which will vaporize under typical firing temperatures, for ceramic materials, leaving the ceramic pigment within the image layer fused to the surface of the ceramic material. The sacrificial substrate preferably comprises a receiving layer and an adhesive layer. Most preferably, the sacrificial substrate is a label FIG. 3 illustrates a decal 200 of this invention comprising image layer 201, receiving layer 202 and adhesion layer 203. The decal is positioned on a ceramic article A.

Figure 4:
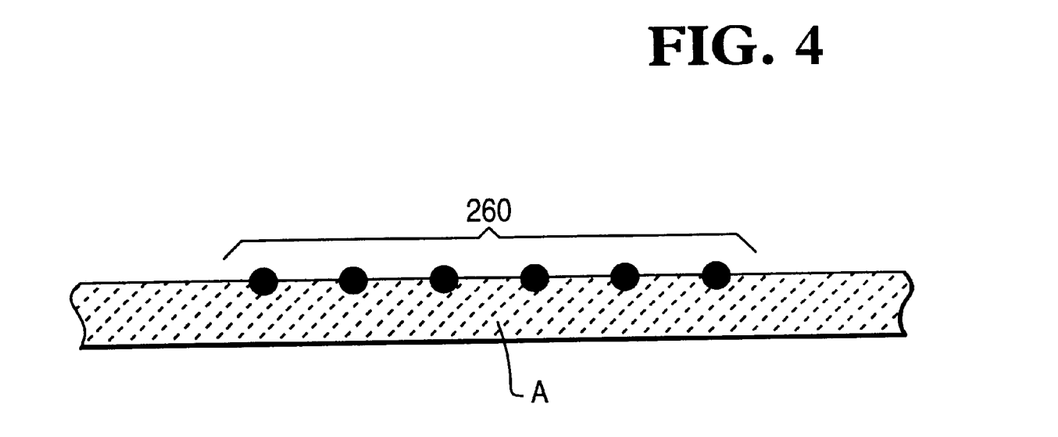
FIG. 4 illustrates a ceramic article subsequent to firing a decal of the present invention on the surface thereof.

FIG. 4 illustrates the surface of a ceramic article of this invention, obtained after the decal has been applied thereto and fired. Ceramic article A has an image 260 formed by the ceramic pigments fused to the surface. The image layer comprises a wax, binder resin and ceramic pigment as described above in the amounts described above for the coating formulation and thermal transfer medium.

Figure 5:
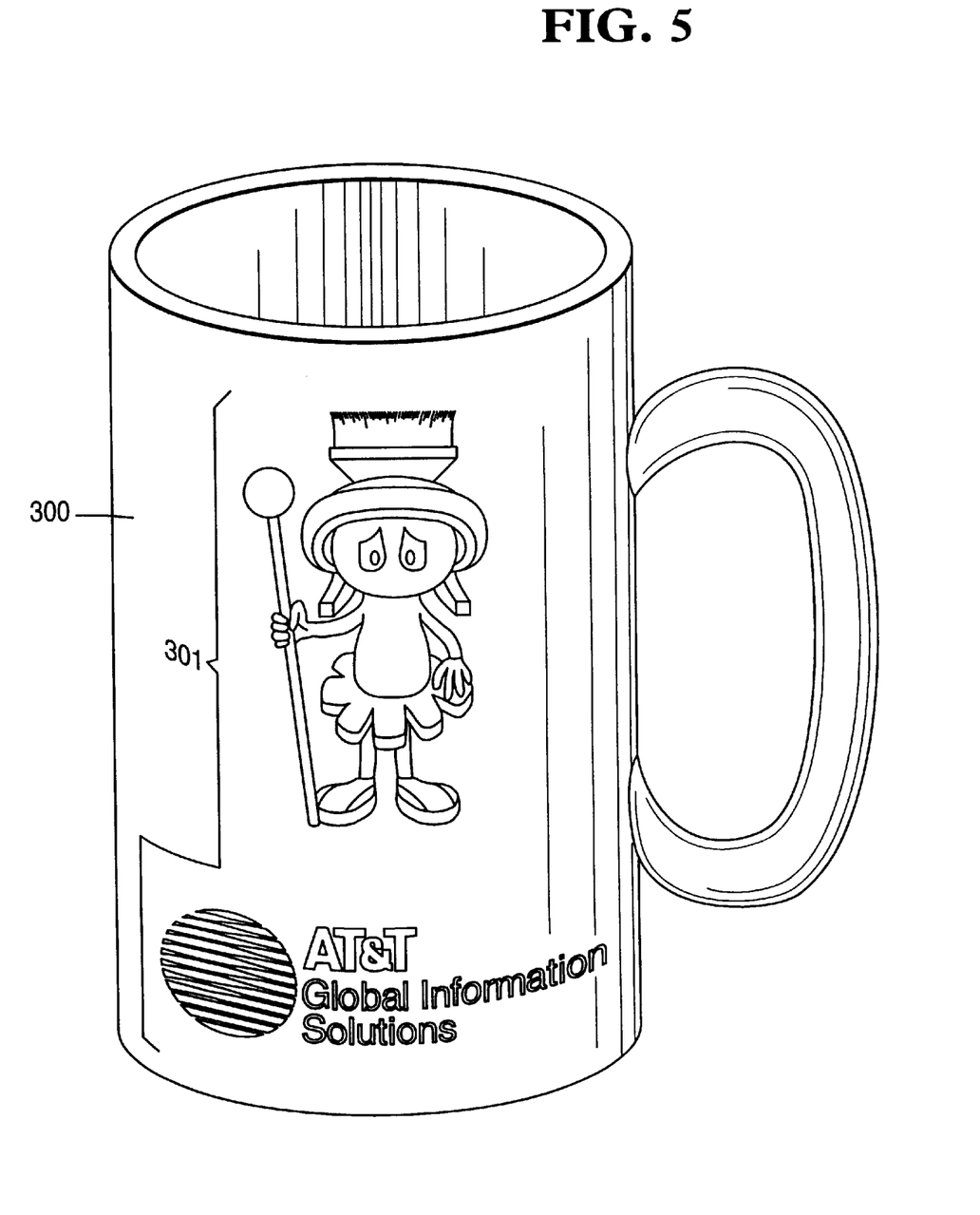
FIG. 5 is a ceramic article of the present invention.

The decal can be patterned in fine detail as shown in FIG. 3, wherein image layer 201 is in the pattern of a bar code. The image can also be a decorative pattern as shown in FIG. 5 which illustrates ceramic article 300 with permanent image 301.

The method provided by this invention involves preparation of the decal by depositing an image layer which contains ceramic pigment on a sacrificial receiving substrate by thermal transfer printing. The decal is then applied to the surface of a ceramic article and firing the article to decompose/vaporize the sacrificial receiving substrate and organic compounds of the image layer (wax/polymer) and deposit the ceramic pigment on the surface of said ceramic article. The printing image layer has an amount of ceramic pigment sufficient to permanently mark the ceramic material when applied thereto and fired on the surface.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLES

Example - Coating Formulation

A coating formulation of the present invention is prepared by mixing mineral spirits, wax and binder resin in the proportions indicated in Table 1 and heating the mixture to 60° C. for 15 minutes. A ceramic pigment mixture (805-ceramic grade black) available from Mineral Pigments Corp. in the amount indicated in Table 1 is added to the resultant mixture at a temperature of from about 60° C. to 65° C for about 10–15 minutes.

TABLE 1

| Material | Wt. % Dry | Wt. % Dry-Range | Grams Dry | Grams Wet |
|---|---|---|---|---|
| Rice Bran Wax[1] | 78.0 | 40–85% | 93.6 | 93.6 |
| EVA Copolymer Resin[2] | 7.0 | 2–30% | 8.4 | 8.4 |
| Ceramic Pigment Mix.[3] | 15.0 | 1–30% | 18 | 18 |
| Mineral Spirits | — | — | — | 480 |
| Total | 100.0 | | 120.0 | 600 |

[1]Rice Bran Wax available from Strahl & Pitsch Inc. in West Babylon, N.Y.
[2]Ethyl Vinyl Acetate Copolymer Resin = "Elvax 260 Ethyl Vinyl Acetate Copolymer Resin" by Chemcentral in Atlanta Georgia.
[3]Ceramic Pigment Mixture = 805-ceramic grade black available from Mineral Pigments Corp.

Thermal Transfer Medium

A thermal transfer medium of the present invention is prepared by coating a formulation as defined above onto a 4.5 μm Polyester Mylar Film by E. I. Dupont de Nemours & Co., Incorporated at a coat weight of from 1.9 to 8 g/m². The solution is coated onto the mylar film at 70° C. using a doctor bar and subsequently dried.

Example 2

Another coating formulation of the present invention can be prepared by adding the following ingredients in Table 2 to a quart sized vessel and mixing for about 10–15 minutes.

The ceramic pigment comprises 805-ceramic grade black at a particle size in the range of 20–200 Å available from Mineral Pigments Corp.

TABLE 2

| INGREDIENT | PERCENT DRY | WET AMOUNT | RANGE (% Dry) |
|---|---|---|---|
| Binder Resin (EC-1052 Latex @40%) | 20.0 | 50.0 | 20–40 |
| Wax (Carnauba Emulsion @25%) | 2.0 | 8.0 | 2–10 |
| Pigment (Ceramic pigment @40%) | 5.0 | 12.5 | 4–20 |
| Wax-Resin (Polyethylene Emulsion @40%) | 12.0 | 30.0 | 10–40 |
| Water | — | 155.5 | |
| Binder resin | 61.0 | 244.0 | 40–70 |
| (Sucrose Benzoate @25% in NPA) | | | |
| Total | 100.0 | 500.0 | Final Solids 20% |

Preparation of a Thermal Transfer Ribbon and Image

The formulation of Example 2 can be coated on polyester (polyethyleneterephthalate) film at about a 1.9–8.0 g/m² coat weight and dried to obtain a thermal transfer ribbon of the present invention. This ribbon is well suited for printing bar codes and other images using a TEC B-30 thermal transfer printer at +2 V setting.

The preceding examples can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for permanently marking ceramic articles with an image which comprises:
   a) depositing an image layer which contains 20–60 wt. % ceramic pigments, 20–85 wt. % wax and 5–60 wt. % binder resin all based on dry components on a sacrificial receiving substrate by thermal transfer printing to form a decal,
   b) applying said decal to a surface of a ceramic article and
   c) firing said ceramic article having said decal applied to the surface thereof to vaporize and/or decompose the sacrificial receiving substrate and the wax and binder resin of the image layer and fuse the ceramic pigments to the surface of said ceramic article in the shape of said image.

2. A process as in claim 1 wherein the receiving substrate is a sacrificial receiving substrate comprised of materials which vaporize under firing conditions.

3. A process as in claim 2 wherein the sacrificial receiving substrate comprises a receiving layer and an adhesive layer and the decal is adhered to the ceramic article before firing.

4. A process as in claim 1 wherein the permanent image formed is a bar code.

5. A process as in claim 1 wherein the permanent image formed is a fanciful design.

6. A process as in claim 1 wherein the permanent image formed is an alpha-numeric character.

7. A process as in claim 1 wherein the image layer additionally contains flux or other vitrifiable solids which form a glaze when fired with the ceramic pigment.

8. A process as in claim 1 wherein the ceramic pigment in the image layer comprises a transition metal oxide selected from the group consisting of spinelles and zircon-silicates.

9. A process as in claim 1 wherein the ceramic pigment in the image layer comprises a combination of transition metal oxide and spectral elements or chromophores.

10. A method for permanently marking ceramic articles with an image which comprises:
    a) depositing an image layer which contains 20–60 wt. % ceramic pigments, 20–85 wt. % wax and binder resin 5–60 wt. % on all based on dry components on a sacrificial receiving substrate by thermal transfer printing to form a decal,
    b) applying said decal to a surface of a ceramic article and,
    c) firing said ceramic article having said decal applied to the surface thereof to vaporize and/or decompose the sacrifical receiving substrate and the wax and binder resin of the image layer and fuse the ceramic pigments to the surface of said ceramic article in the shape of said image,
    wherein the image layer comprises thermoplastic polymer resin as binder resin, and said thermoplastic polymer resin and wax are vaporizable without carbonizing.

11. A process as in claim 1 wherein the ceramic pigment in the image layer is selected from the group consisting of:
    zircon based pigments,
    zinc-chromite based pigments,
    vanadium-containing zircon based pigments,
    praseodymium-containing zircon based pigments,
    cobalt based pigments,
    cobalt-aluminum based pigments,
    cadmium red based enamels,
    iron-containing zircon based pigments, and mixtures thereof.

12. A process as in claim 10 wherein the receiving substrate is a sacrificial receiving substrate comprised of materials which vaporize under firing conditions.

13. A process as in claim 12 wherein the sacrificial receiving substrate comprises a receiving layer and an adhesive layer and the decal is adhered to the ceramic article before firing.

14. A process as in claim 10 wherein the image layer additionally contains flux or other vitrifiable solids which form a glaze when fired with the ceramic pigment.

15. A process as in claim 10 wherein the ceramic pigment in the image layer comprises a transition metal oxide selected from the group consisting of spinelles and zircon-silicates.

16. A process as in claim 10 wherein the ceramic pigment in the image layer comprises a combination of transition metal oxide and spectral elements or chromophores.

* * * * *

UNITED STATES PATENT AND TRADEMARK OFFICE
CERTIFICATE OF CORRECTION

PATENT NO. : 6,149,747
DATED : November 21, 2000
INVENTOR(S) : Michael A. Lorenz et al.

It is certified that error appears in the above-indentified patent and that said Letters Patent is hereby corrected as shown below:

Page 1, [73] Assignee: delete "NEC Corporation" and insert -- NCR Corporation, Dayton, Ohio --.

Signed and Sealed this

Twenty-ninth Day of May, 2001

Attest:

NICHOLAS P. GODICI

*Attesting Officer*    *Acting Director of the United States Patent and Trademark Office*